United States Patent [19]

Mastroianni et al.

[11] Patent Number: 5,557,980
[45] Date of Patent: Sep. 24, 1996

[54] ONE-PIECE GEAR RATTLE PREVENTION FOR COUNTERSHAFT TRANSMISSION

[75] Inventors: Cesare G. Mastroianni, Denver, N.C.; Timothy E. Mick, Rochester Hills, Mich.

[73] Assignee: Getrag Gears of North America, Inc., Sterling Heights, Mich.

[21] Appl. No.: 287,086

[22] Filed: Aug. 8, 1994

Related U.S. Application Data

[63] Continuation-in-part of Ser. No. 988,292, Dec. 8, 1992, Pat. No. 5,335,562.
[51] Int. Cl.⁶ .................. F16D 1/08; F16H 55/14
[52] U.S. Cl. ........................... 74/443; 192/54.3
[58] Field of Search ............ 74/410, 443, 461; 192/30 V, 53.34, 53.343

[56] References Cited

U.S. PATENT DOCUMENTS

| | | | |
|---|---|---|---|
| 4,483,210 | 11/1984 | Mayuzumi | 74/329 X |
| 4,519,265 | 5/1985 | Dolan et al. | 192/30 V X |
| 4,677,868 | 7/1987 | Filkins | 74/443 X |
| 4,989,712 | 2/1991 | Janiszewski | 192/30 V X |

FOREIGN PATENT DOCUMENTS

| | | | |
|---|---|---|---|
| 1500516 | 7/1969 | Germany | 192/30 V |
| 3137205 | 4/1983 | Germany | 74/443 |
| 84245 | 5/1983 | Japan | 74/443 |
| 109765 | 7/1983 | Japan | 74/443 |

*Primary Examiner*—Khoi Q. Ta
*Attorney, Agent, or Firm*—Gifford, Krass, Groh, Sprinkle, Patmore, Anderson & Citkowski, P.C.

[57] ABSTRACT

A multi-speed rear wheel drive transmission having synchronizers and a plurality of gears rotatable on the input shaft provides for the elimination of neutral roll-over noise and optimization of common reduced size synchronizers. Gear face widths are also reduced along with shaft diameters to further optimize the transmission design. Towing restrictions are no longer required in vehicles utilizing this design. The input shaft is coaxial with the output shaft and may be connected by synchronizer to the output shaft. A countershaft is in continuous meshing contact with the output shaft. Also disclosed is a device for correcting in-gear rattle, as well as a lubricating pump assembly utilizing an axial bore in the input shaft. Finally, a transmission with a power take-off assembly is disclosed.

3 Claims, 6 Drawing Sheets

ONE-PIECE GEAR RATTLE PREVENTION FOR COUNTERSHAFT TRANSMISSION

This is a continuation-in-part of application Ser. No. 07/988,292 filed Dec. 8, 1992, now U.S. Pat. No. 5,335,562.

BACKGROUND OF THE INVENTION

I. Field of the Invention

The present invention relates to transmissions. More particularly, the present invention relates to multi-speed rear wheel drive transmissions.

II. Description of the Prior Art

Typically, most rear wheel drive transmissions are constructed with a short input shaft which transmits driving torque from a source such as an engine through a pair of gears known as a headset, to a countershaft. The countershaft is located parallel to the input shaft and is positioned amid a plurality of driving gears. An output shaft, having a plurality of driven output gears surrounding the shaft, is located parallel to the countershaft. Each of the driven output gears surrounding the output shaft is in mesh with a corresponding driving gear from the plurality of gears on the countershaft. Usually the output shaft is coaxial with the input shaft. A number of axially reciprocating synchronizers are coupled to the output shaft or countershaft to engage one of the speed gears on one side and another of the speed gears on its other side. One of the speed gears on the output shaft is a reverse gear which is in mesh with the driving gear on the countershaft through an idler gear. Most often, the output shaft is coaxial with the input shaft with one of the synchronizers arranged to engage, in one position, the input shaft directly to the output shaft to effect one of the speed changes.

With the typical headset multi-speed transmission, all of the driving and driven speed gears are in continuous motion when the vehicle is stationary, the transmission is in neutral, the driving source, or engine, is running and the clutch is engaged. Invariably, the driving source, or engine, generates angular accelerations in the power output characteristics that induce rotational harmonics of the drive train. The rotational harmonics of the rotating gears of the typical headset multi-speed transmission cause a considerable noise problem commonly referred to as "neutral roll-over noise".

With the typical headset transmission design, the torque of the driving source or engine is multiplied by the headset gear ratio. Hence, all of the speed gears that transmit torque in the power flow sequence after the headset must have an adequate face width to transmit the multiplied torque. Since the torque multiplication is transmitted through a single driving gear on the countershaft to an engaged driven gear on the output shaft, the countershaft and output shaft have to be sized and supported to withstand considerable deflection forces.

When shifting gears in a conventional headset transmission, the activated synchronizer must speed up or slow down the revolutions (rpm) of all of the speed gears, countershaft, input shaft and clutch disc. The shift sequence, first to second, third to fourth, third to second, etc. determines the magnitude of the rpm changes affected at the speed gears, countershaft, input shaft and clutch disc. The rpm changes of these rotating masses create a different amount of reflected inertia at the activated synchronizer, which results in the need of different synchronizer sizes to produce an acceptably low shift effort. Recently, double and triple cone synchronizers have been used to reduce shift effort.

Vehicles equipped with a typical headset multi-speed transmission cannot be towed without restrictions and/or the risk of serious damage to the transmission when the rear wheels of the vehicle are in contact with the pavement, the transmission is in neutral and the drive train clutch is engaged to the stationary driving source or engine. Under these conditions, the rotation of the output shaft may cause serious damage to bearings, journals, or thrust surfaces, since the rest of the transmission components are in a stationary state and adequate lubrication of the bearings, journals, gear meshes, or thrust surfaces does not occur. To avoid such damage, towing under these conditions is typically restricted to speeds of no greater than 30 miles per hour and for distances of 50 miles or less.

SUMMARY OF THE INVENTION

The present invention is directed to overcoming the various disadvantages outlined relative to the prior art headset transmission. With the transmission of the invention, neutral roll-over noise is eliminated. The gear face widths are minimized and reduced. Shaft deflections and, thus, the diameter of the shafts can be reduced. The required synchronizer capacity and size is the same in all positions and, thus, size is minimized. Vehicles containing the transmission can be towed with the transmission in neutral without restrictions since lubrication of the bearings, journals, and thrust surfaces occurs.

The multi-speed transmission of this invention is particularly designed for rear wheel drive vehicles and includes a driven input shaft. A first series of driving speed gears surrounds the input shaft. A number of single sized synchronizers are coupled to the input shaft and arranged operatively to couple with one of two of the series of driving speed gears. A countershaft arranged parallel to the input shaft has a series of driven speed gears meshing with different ones of the driving speed gears on the input shaft. One of the driven speed gears on the countershaft can be engaged with the reverse driving speed gear on the input shaft through an idler gear. An output shaft is arranged coaxial with the input shaft and is parallel with the countershaft. The countershaft is coupled to the output shaft by a driving output gear fixed to the countershaft in mesh with a driven output gear fixed to the output shaft. The driving output gear and driven output gear are referred to as a final drive set, hence, the arrangement of the invention is referred to as a final drive, multi-speed rear wheel drive transmission.

With the foregoing arrangement of the invention, all of the driving and driven gears are stationary when the vehicle is stationary, the transmission is in neutral, the driving source or engine is running, and the clutch is engaged. Therefore, neutral roll-over noise is eliminated.

With the foregoing arrangement of the invention, there is no headset torque multiplication, therefore, the face widths of the speed gears can be reduced. Likewise, shaft deflections are reduced permitting a reduction in shaft diameters.

With the foregoing arrangement of the invention, the inertias of the speed gears and the countershaft are no longer a factor during synchronization because these inertias are now directly coupled to the drive shaft through the final drive gear mesh and become a part of the vehicle inertia. Therefore, each of the synchronizers can be of the same minimum size. The minimum size is dictated by the size of the gears which the synchronizers act upon. This results in a synchronizer which, even for the smallest gear, is larger than needed to produce acceptably low shift efforts.

Vehicles equipped with the transmission of the foregoing arrangement of the invention can be towed without restrictions and/or the risk of serious damage to the transmission when the vehicle wheels are in contact with the pavement, and the transmission is in neutral and the drive train clutch is engaged to the stationary driving source or engine. This is possible since rotation of the transmission output shaft induces rotation of the countershaft through the final drive gear mesh and all of the gears within the transmission, which results in oil splash and lubrication to bearings, journals, gear meshes and thrust surfaces.

Also disclosed is a first alternative preferred embodiment of a final drive transmission having an engagement device disposed between a synchronizer and gear to dampen "in-gear" or "drive rattle" noise. Because the final drive transmission provides excess synchronizer capacity, it is possible to add an engagement device without increasing the capacity of the synchronizer. Also disclosed is an input shaft mounted lubrication fluid pump. The pump forces fluid through an axial bore in the input shaft for delivery to radially disposed outlet passages. The continuously rotating input shaft generates centrifugal force to deliver lubricating fluid through the outlet passages to the synchronizers and gears.

A second preferred embodiment is also disclosed for eliminating in-gear or drive rattle noise. In the second alternative embodiment, the first and second drive gears are fixedly mounted to the input shaft. The corresponding driven gears and a synchronizer are mounted on the countershaft. The remaining speed gear pairs are mounted on the input shaft and the countershaft in the manner of a final drive transmission.

Finally, a third preferred alternative embodiment of the final gear transmission having a power take-off assembly is disclosed. The transmission includes a drive gear splined to the input shaft and a driven gear mounted for rotation on a countershaft. Apertures are provided on either side of the housing opposite the driven gear for mounting a conventional power take-off assembly.

BRIEF DESCRIPTION OF THE DRAWING

The advantages of the present invention will be more apparent from the following detailed description when considered in connection with the accompanying drawing wherein.

DETAILED DESCRIPTION OF THE PREFERRED EMBODIMENTS

Figure 1:
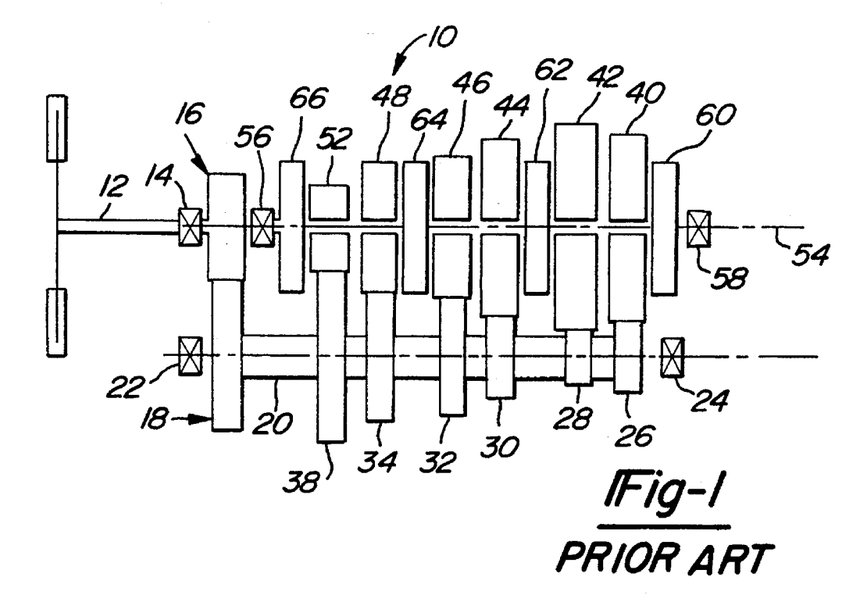
FIG. 1 is a schematic view of a typical headset multi-speed rear wheel drive transmission according to the prior art.

Referring to the drawing, and particularly to FIG. 1, a prior art six speed headset transmission 10 is shown. A headset transmission is a transmission which includes an input shaft 12 journalled in bearing 14 which carries a driving gear 16 which is in mesh with driven gear 18 coupled to countershaft 20 journalled at its ends in bearings 22 and 24. Countershaft 20 carries a number of driving gears integrally formed with the shaft or coupled to the shaft. These driving gears 26, 28, 30, 32, 34, and 38, are respectively, the reverse, first, second, third, fourth, and sixth gears of the transmission and are in constant mesh with driven speed gears 40, 42, 44, 46, 48, and 52 surrounding an output shaft 54 journalled at its ends in bearings 56 and 58. Bearing 56 can be a bearing internally contained in input shaft 12. Synchronizers 60, 62, 64 and 66 are coupled to output shaft 54 for reciprocal axial movement to selectively engage adjacent gears on either side by the use of inter-engaging splines and known principals of synchronizer design. For example, synchronizer 62 can be moved to the right as seen in FIG. 1 to engage first gear 42 with the output shaft 54, or it can be moved to the left to engage second gear 44 with the output shaft 54.

Likewise, synchronizer 66 can be moved to the right as viewed in FIG. 1 to engage sixth gear 52 with the output shaft 54, or can be moved to the left to engage input shaft 12 directly with the output shaft 54 for a 1:1 ratio, which in this case serves as the fifth gear.

It can be seen that all of the gears on both the countershaft 20 and output shaft 54 are in continuous movement through the gears 16 and 18, therefore, when the transmission is in neutral, the complete gear set is rotating. This rotation causes neutral roll-over noise. Since there is an engine torque multiplication created by the driving input gear 16 and the driven countershaft gear 18, the gears on the output shaft 54 and the countershaft 20 must have adequate face width to transfer the engine torque from the input shaft 12 to the output shaft 54. For this same reason, countershaft 20 and the output shaft 54 must be sized and supported to withstand considerable deflection forces. Furthermore, during synchronization, each of the gear meshes 40–26, 42–28, 44–30, 46–32, 48–34, 52–38, and 16–18 create different amounts of reflected inertia, requiring that the individual synchronizers 60, 62, 64 and 66 be sized to best handle the work required to effect the speed changes through the gears on either side of the individual synchronizer.

Figure 2:
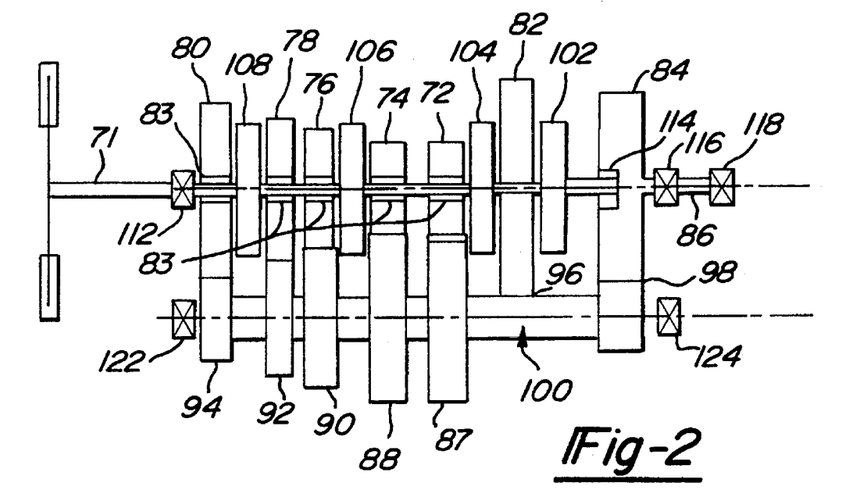
FIG. 2 is a schematic view of a transmission according to a preferred embodiment of the invention.
Figure 3:
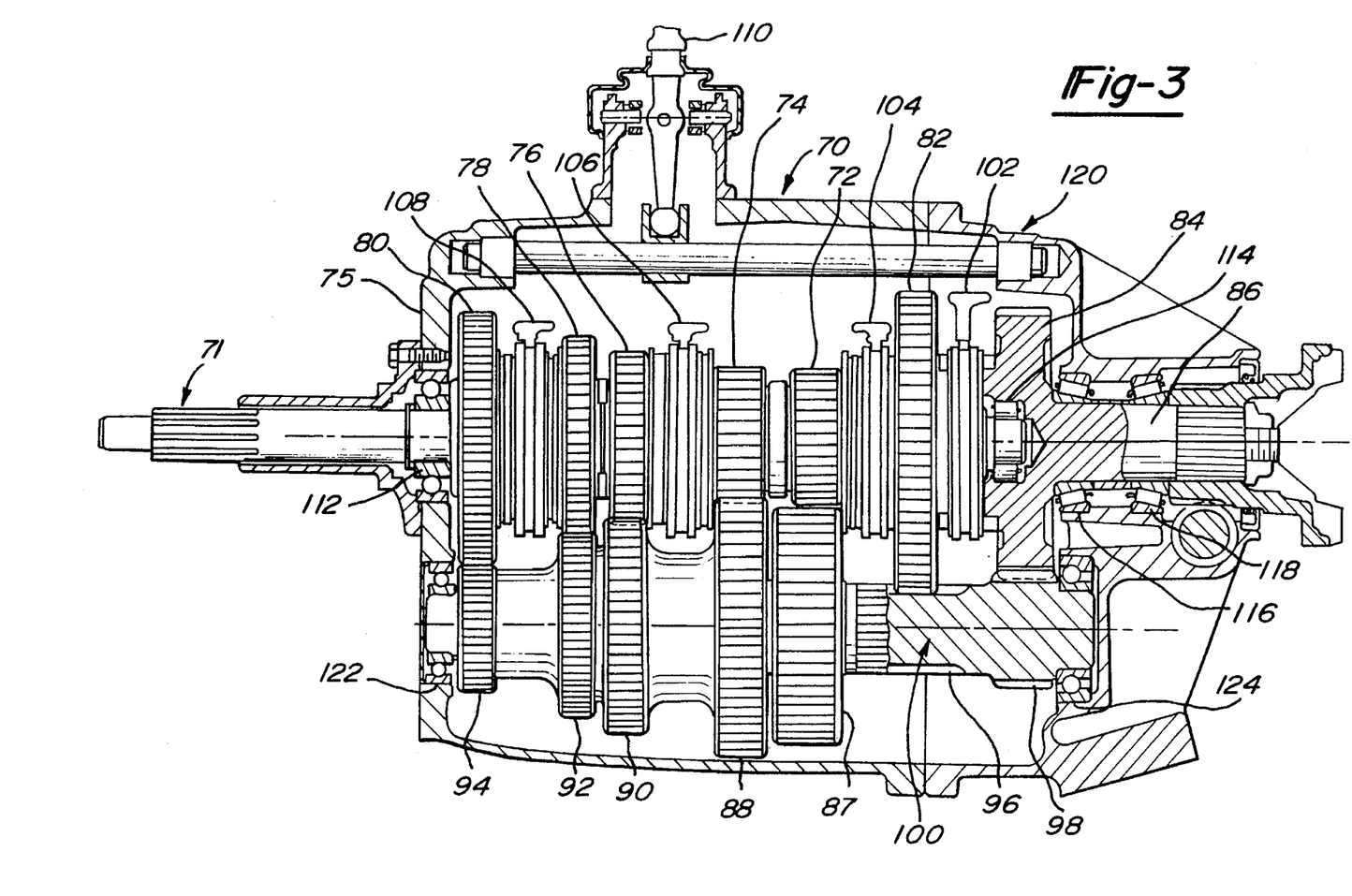
FIG. 3 is an elevational view, partially in section, of a transmission according to the preferred embodiment of the invention.

Referring now to FIGS. 2 and 3, the transmission 70, according to the invention, has an input shaft 71 extending through the wall of a front housing 75 terminating within a rear housing 120. A series of driving speed gears surround the input shaft 71 and are supported for rotation about the input shaft 71 by coaxial needle bearings 83 (FIG. 2). The driving speed gears 72, 74, 76, 78, 80 and 82 constitute, respectively, the reverse, first, second, third, fourth, and sixth gears of the transmission. The driving speed gears are in constant mesh with driven gears 87, 88, 90, 92, 94, and 96 mounted on the countershaft 100. A final drive pinion gear 98 on the countershaft 100 is in constant mesh with the driven output gear 84 on an output shaft 86. Thus, the first gear 74 is the smallest of the gears.

The input shaft 71 is supported by a conventional bearing 112, such as a ball bearing or a tapered roller bearing, in the front housing 75 and by bearing 114 on the other end at the output shaft 86. The output shaft 86 is supported by spaced opposed tapered roller bearings 116 and 118 in the rear housing 120. Countershaft 100 is supported at its ends by bearing 122 and bearing 124.

Synchronizers 102, 104, 106 and 108 are coupled to the input shaft 71 for reciprocal axial movement to selectively engage adjacent gears on either side by the use of interengaging splines. For example, the synchronizer 106 can be moved to the right as viewed in FIG. 2 to engage first gear 74, or it can be moved to the left to engage second gear 76. Likewise, synchronizer 102 can be moved to the left as viewed in FIG. 2 to engage sixth gear 82 or to the right to engage the input shaft 71 directly with the output shaft 86 for a 1:1 ratio, which in this case serves as the fifth gear. The synchronizers 102, 104, 106 and 108 are actuated through the shift mechanism 110, not described in this disclosure.

Figure 4:
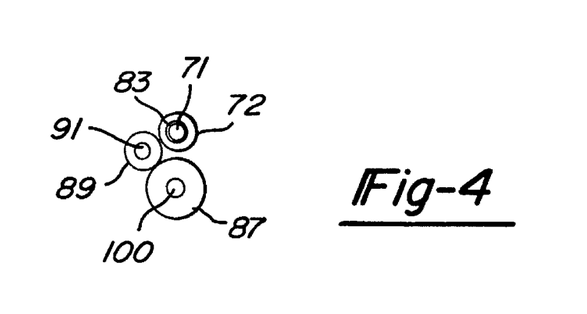
FIG. 4 is a schematic view of the reverse gears and idler gear assembly according to the preferred embodiment of the invention.

As shown in FIG. 4, an idler gear 89, mounted on a shaft 91, is in mesh with driving gear 72 and driven gear 87 to provide a reverse gearing when the synchronizer 104 is moved for engagement with driving gear 72. As is known in the art, the shaft 91 is supported by bearings (not shown) in a parallel alignment with the input shaft 71 and countershaft 100.

With the present invention, all gears are idle when the vehicle is stationary, the transmission is in neutral, the engine is running and the clutch is engaged, therefore, neutral roll-over noise is eliminated. This results in a cost savings for clutch disc design since a pre-damper stage is no longer required. Also, the elimination of the pre-damper stage reduces drive line clunk.

Since in the power flow sequence there is no engine torque multiplication created by a gear mesh ahead of the gear meshes formed by the speed gears on the input shaft 71 and the mating gears on the countershaft 100, the face widths of the gears on the input shaft 71 and countershaft 100 can be reduced compared to the prior art design, thereby, reducing the overall length of the transmission. The only gears that will transmit multiplied engine torque are the final drive pinion 98 and gear 84. Thus, these are the only gears that will have face widths comparable to the prior art design.

With the lower torque load carried by the speed gears along with adequate bearing support provided by bearings 112, 114, 116, 118, 122 and 124, the deflections of input shaft 71 and countershaft 100 are reduced allowing reduction in shaft diameters.

It can also be seen with the present invention that the inertias of the speed gears and the countershaft are no longer a factor during synchronization because these inertias are now directly coupled to the drive shaft through the final drive gear mesh and become part of the vehicle inertia. Therefore, synchronizers 102, 104, 106 and 108 can be of the same optimum size since the work they must perform during the synchronization of any speed change involves changing the speed of only the input shaft, synchronizer assembly and clutch disc inertias.

Figure 5:
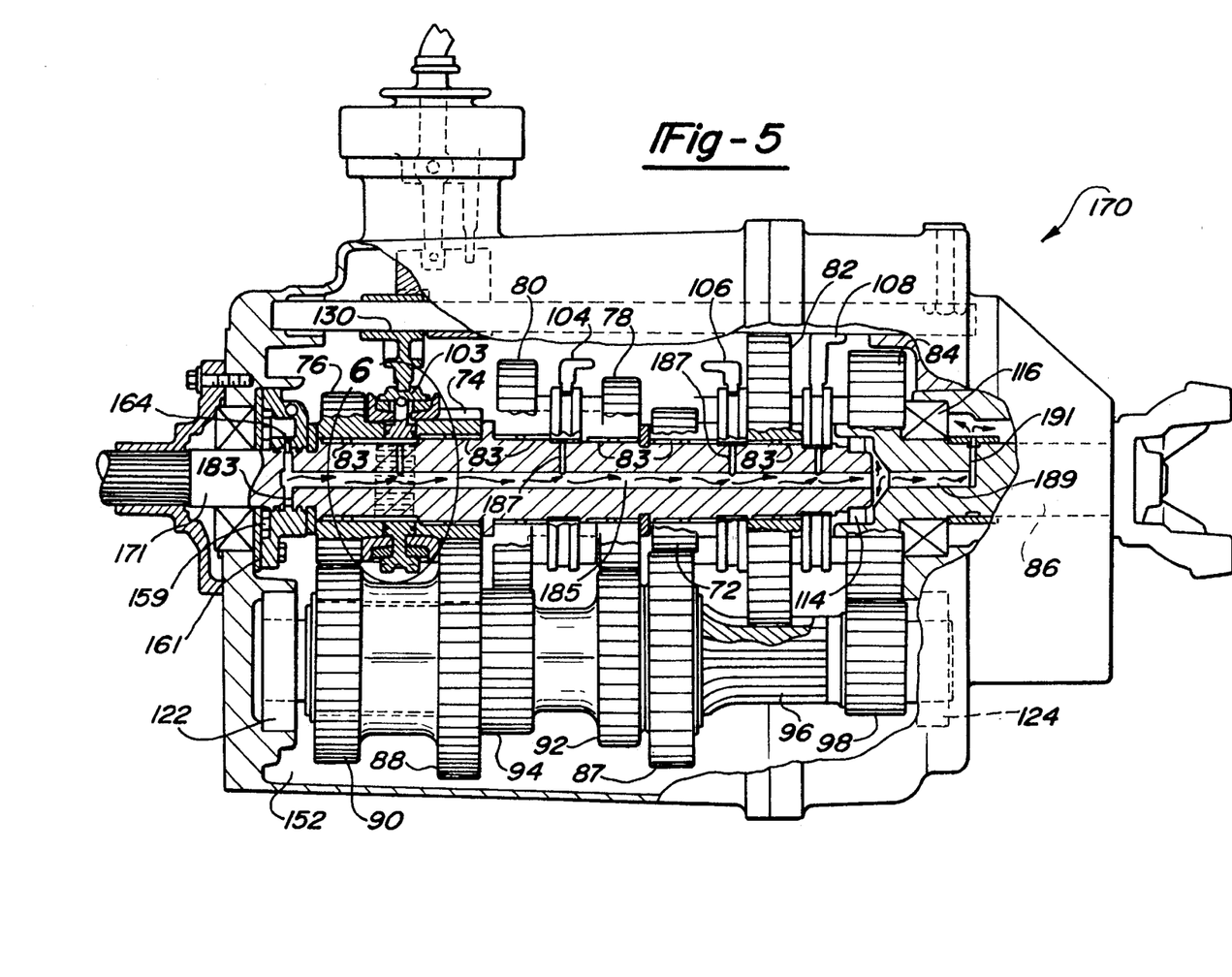
FIG. 5 is an elevational view, partially in section, of a transmission constructed according to a first alternative embodiment of the invention.

A first alternative preferred embodiment of a final drive transmission according to the invention is shown in FIGS. 5–9. The transmission 170 includes an engagement device positioned to reduce in-gear rattle, and a centrifugal oil pump assembly. As shown in FIG. 5, the transmission 170 has an input shaft 171 having a series of driving speed gears 72, 74, 76, 78, 80 and 82 supported for rotation by coaxial needle bearings 83. The driving speed gears are in constant mesh with driven gears 87, 88, 90, 92, 94, and 96. Each driven gear has a synchronizer cone 132 mounted on countershaft 100. A final drive pinion gear 98 on the countershaft 100 is in constant mesh with the driven output gear 84 on the output shaft 86. The input shaft 171 and the countershaft 100 are supported as discussed above. Synchronizers 103, 104, 106, and 108 are splined to the input shaft 171.

Figures 6, 7, 8, 12:
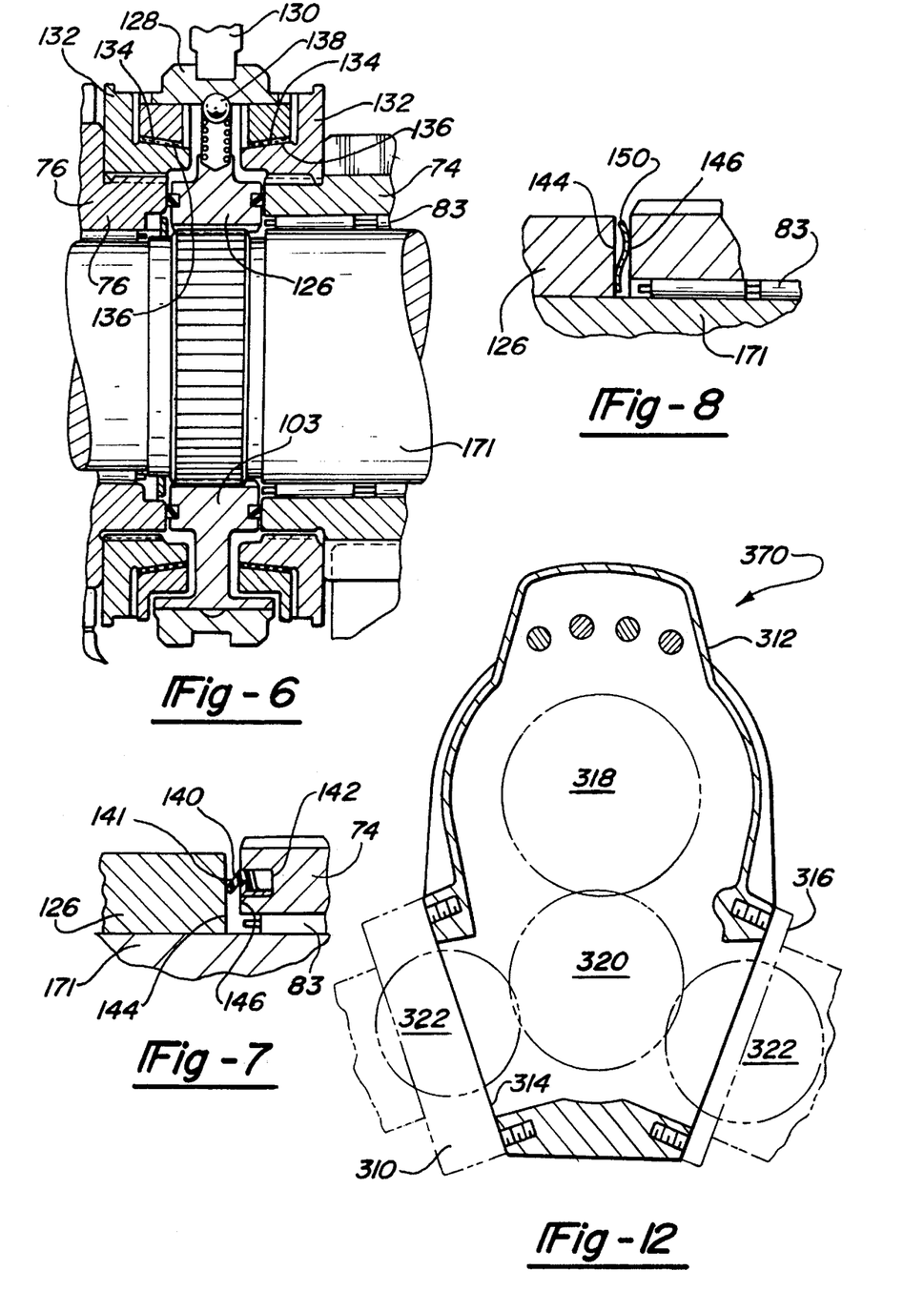
FIG. 6 is a partial elevational view of a synchronizer and engagement device according to the first alternative embodiment of the invention taken from inset 6 of FIG. 5.
FIG. 7 is a fragmentary view of the engagement device of the first alternative embodiment in accordance with the invention.
FIG. 8 is a fragmentary view of a belleville washer positioned as an alternative engagement device in accordance with the invention.
FIG. 12 is a cross-sectional view of the third embodiment of the transmission having a power take-off assembly according to the invention taken along lines 12—12 of FIG. 11.

As best shown in FIG. 6, the synchronizer 103 has a hub 126 splined to the input shaft 171. The hub 126 supports a sleeve 128 which is axially movable by way of a gear shift linkage 130 between the synchronizer clutch gears 132 of the speed gears 74 and 76. Cone surfaces 134 are formed at either end to correspond to matching cone surfaces 136 formed on the synchronizer clutch gears 132 of the speed gears 74 and 76. A spring loaded ball 138 is mounted in the hub to apply an indexing load to the cone surfaces 134. As discussed above, the cone surfaces of the synchronizer of a conventional transmission are required to handle the reflected inertias of the speed gears, countershaft, input shaft, and clutch disc and, accordingly, are increased in size or number of cones to attain acceptably low shift efforts. In the final drive transmission according to the invention there is no reflected inertia effect from the speed gears and countershaft. Therefore, minimum size synchronizers are required, restrained by the minimum dimension of the cone on the speed gears. The minimum size of each cone is limited by the diameter of the speed gear necessary to encircle the input shaft. This results in synchronizer sizes larger than necessary to produce low shift effort, even for the largest of the rpm changes during shifting. The synchronizer size, accordingly, may be of the same minimal size for all of the gears.

It has been found that the final drive transmission may be subject to certain gear rattle when the transmission is engaged. This noise is referred to as in-gear or drive rattle noise. Drive rattle noise occurs because gears on the input shaft which are not engaged by the synchronizer are not subject to load and have a tendency to rattle. This appears to be particularly true of the low speed gear 74. Accordingly, an engagement device may be mounted to engage the gears. As best shown in FIG. 7, a ring 140 having a friction producing arm 141 is mounted to the synchronizer 103. An annular groove 142 is formed on radially extending side surfaces 144 of the hub 126 of the synchronizer 103. The groove 142 is disposed opposite a radial surface 146 of adjacent gear 74. The ring 140 and arm 141 are unitarily formed of suitable resilient material such elastomer or rubber as that used for oil seals. The arm 141 extends to engage the gear 74 and prevent rattling during operation of the transmission 170. Because the synchronizer 103 has excess capacity, the addition of friction to the gear may be had without any need for increasing the size of the synchronizer 103 as would be required in a headset transmission. This size synchronizer has more capacity than necessary to produce a low shift effort for even the largest of the rpm changes during shifting. The engagement device is shown mounted between synchronizer 103 and gears 74 and 76 because it has been found that these gears are particularly susceptible to in-gear rattle. The engagement device may be used with synchronizers 104, 106 and 108 if desired.

In FIG. 8 is shown an alternative engagement device in the form of a belleville washer 150 disposed between radial surface 144 of the hub 126 of the synchronizer 103 and radial surface 146 of gear 74. The washer 150 places a force on the gear 74 to maintain the position of gear during operation of the transmission and prevent rattle.

Figure 9:
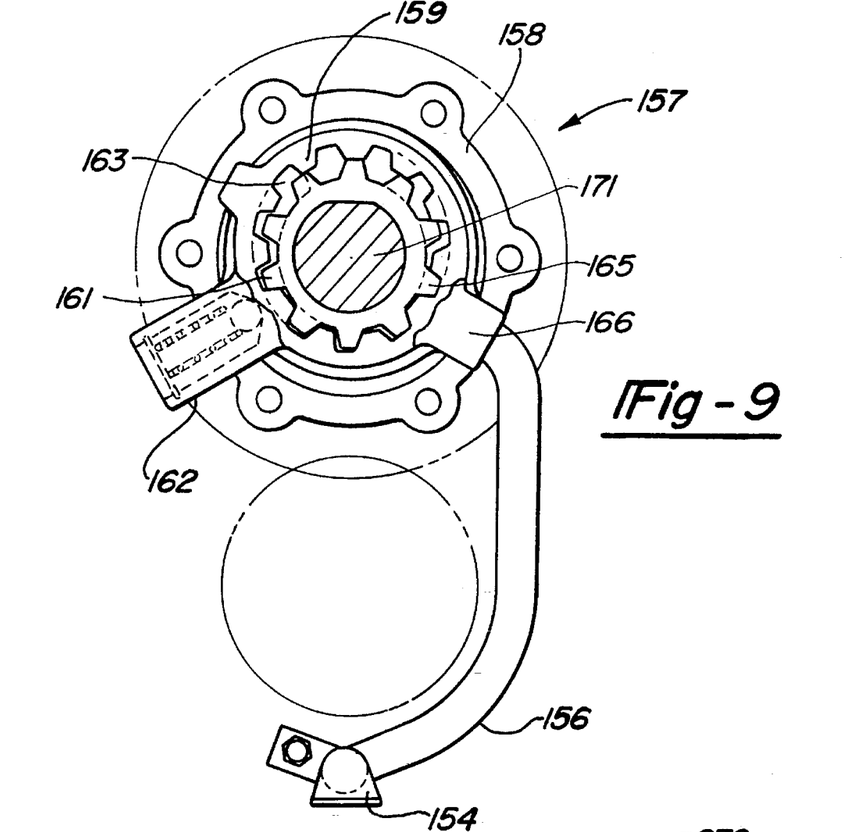
FIG. 9 is a cross-sectional view of an oil pump in accordance with the first alternative embodiment of the invention.

As shown in FIGS. 5 and 9, the transmission 170 includes a lubricating fluid pump assembly. Lubricating fluid is pumped from a sump 152 through a filter 154 and a conduit 156 by a gerotor pump 157 mounted around the input shaft 171. The gerotor pump 157 includes a housing 158 and an outer rotor 159 in mesh around an inner rotor 161 fixedly attached to the input shaft 171. Pumping chambers 163 are formed between rotor lobes 165 of the rotors 159, 161. Fluid is drawn into the pumping chamber 163 through an inlet 166 and delivered from the pumping chamber 163 to an outlet passage 104 in the housing 158. A conventional pressure relief valve 162 is provided in the housing 158 for relieving excess pressure in the pumping chamber 163. As best shown in FIG. 5, the fluid is carried from the outlet passage 164 through a radial bore 183 through a centrally disposed axial bore 185 in the input shaft 171. A series of radially disposed outlet passages 187 extend from the axial bore to each synchronizer 103, 104, 106, and 108. An axial bore 189 also extends through the output shaft 86 to a radial passage 191. Fluid is delivered underneath the synchronizer hubs and then outwardly by centrifugal force to lubricate the cones of the synchronizer, adjacent gears and needle bearings. Likewise, fluid is pumped axially by the gerotor pump through the axial bore 189 of the output shaft 86 to provide fluid for lubrication to the opposed taper roller bearings through radial passage 191. Because conventional lubrication systems lubricate the transmission by passing the teeth of the gears through fluid in the sump, the sump must include sufficient oil to cover the teeth of the gears. Because the pump assembly of the present invention does not require the gear teeth to traverse through the fluid in the sump 152, it is possible to have a much lower level of fluid in the sump 152 than known in conventional transmissions.

Figure 10:
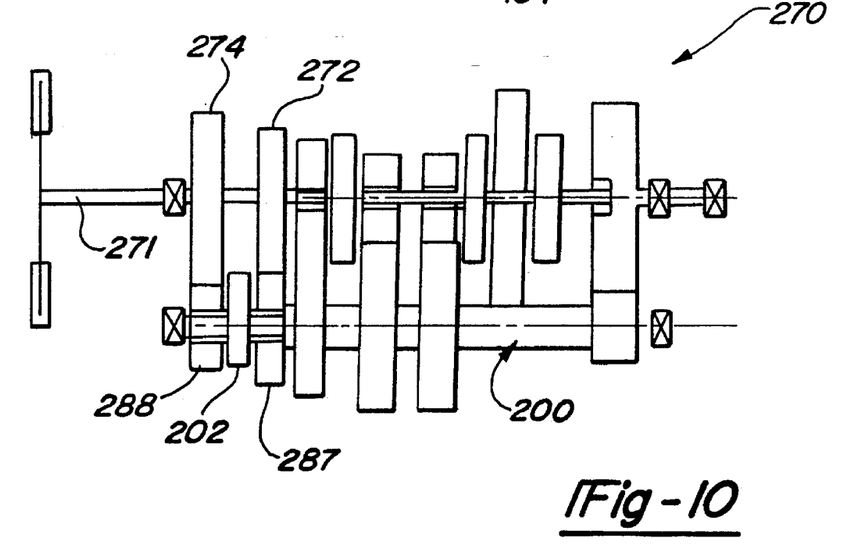
FIG. 10 is a schematic view of a second alternative embodiment of a transmission according to the invention.

A second alternative embodiment of a transmission 270 is shown schematically in FIG. 10. The second preferred embodiment includes a final drive transmission having two gear pair, such as first drive gear 272 and a second drive gear 274, fixedly attached to the input shaft 271 and corresponding driven gears 287, 288 supported by needle bearings 83 on countershaft 200 and connectable to the countershaft 200 by way of a synchronizer 202. Two or four gear pairs could be arranged in this fashion, with the drive gears fixedly attached to the input shaft and the corresponding driven gears supported by the needle bearings on the countershaft and connectable to the countershaft by the way of synchronizers. All other aspects of the transmission according to the second preferred embodiment are the same as disclosed above for the preferred embodiment of the invention.

Figure 11:
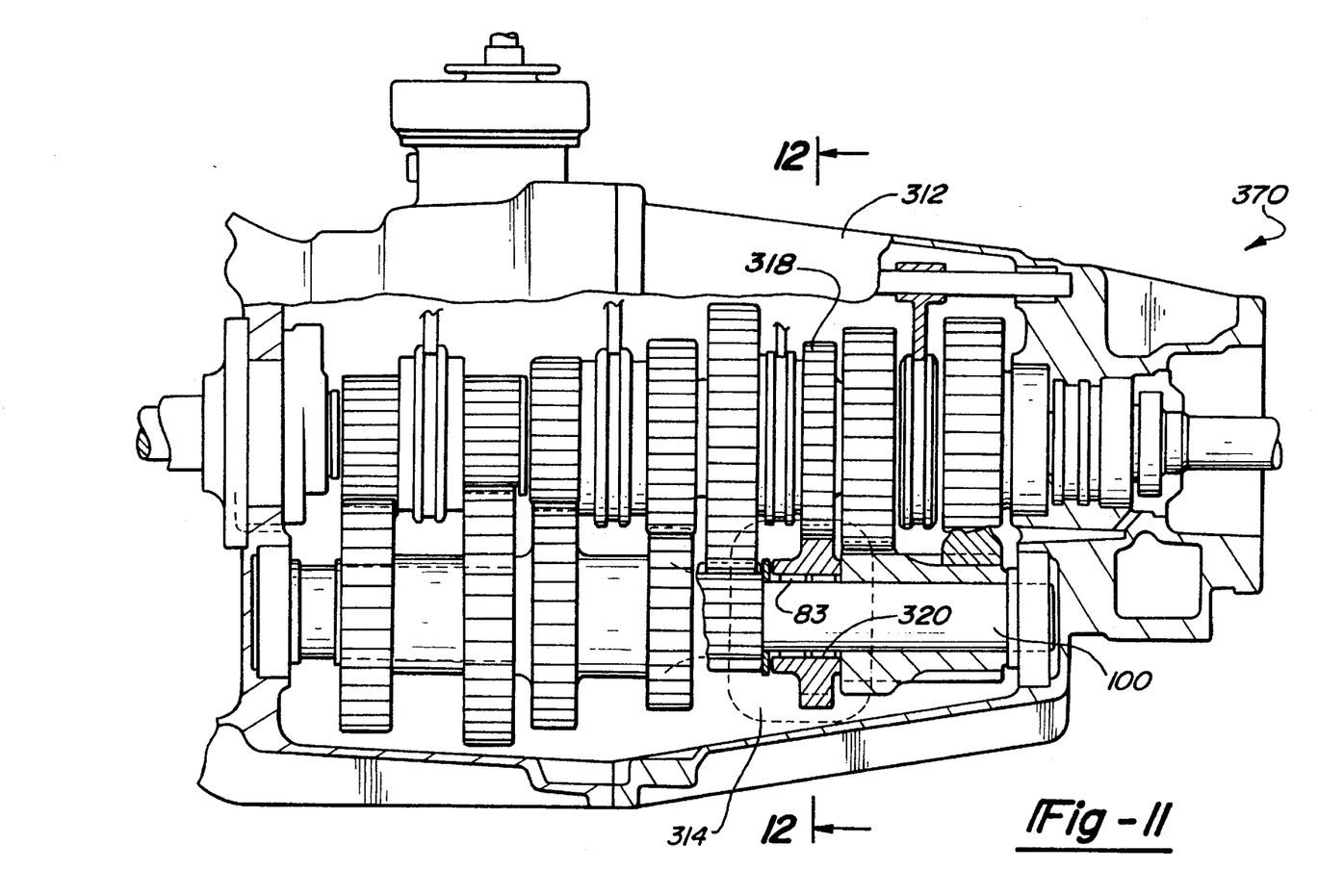
FIG. 11 is an elevational view, partially in section, of a third alternative embodiment of a transmission according to the invention.

A third alternative embodiment of the final drive transmission 370 adapted for use with a conventional power take-off (PTO) assembly 310 is shown in FIGS. 11 and 12. As known in the art, the PTO assembly 310 includes a clutch and control mechanism to selectively deliver power from the transmission 370 to a shaft (not shown) for powering auxiliary equipment such as hydraulic motors. Housing 312 is provided with a pair of apertures 314 disposed on either side of the countershaft 100. The conventional power take-off assembly 310 is mounted on a desired side of the transmission housing 312 by bolting the PTO assembly 310 onto the housing 312 over the aperture 314. A plate 316 is bolted to the housing 312 to cover the other aperture 314. A drive gear 318 is splined to the drive shaft 71 and a driven gear 320 is mounted on needle bearings 83 to the countershaft 100. The driven gear 320 is positioned opposite the apertures 314 to permit meshing engagement with a driven gear 322 of the PTO assembly 310. In this way, the final drive transmission can be provided with a power take-off assembly on either side of the housing.

Although a six speed transmission is shown herein, it is clearly within the scope of the invention to encompass a seven speed transmission.

Towing restrictions for the vehicle are no longer required, since the final drive gear set is in constant mesh and connected to the drive shaft. This enables the countershaft and speed gears to turn when the transmission is in neutral, the vehicle rear wheels are in contact with the pavement, and the clutch is engaged to the stopped engine. The turning countershaft gears provide the oil splash required to lubricate the needle bearings, support bearings, journals, gear meshes and thrust surfaces.

The embodiments of the invention in which an exclusive property or privilege is claimed are defined as follows.

We claim:

1. A transmission for use in a vehicle, said transmission comprising:

a housing having an input shaft and a countershaft;

at least one drive gear mounted for rotation about said input shaft;

at least one driven gear mounted to said countershaft;

a synchronizer for coupling said at least one driven gear to said input shaft;

a ring having an annular portion mounted to said at least one driven gear and a resilient arm extending at an angle axially outwardly and radially inwardly from said annular portion to contact synchronizer to hold said driven gear from rattling when said driven gear is not coupled to said input shaft.

2. The transmission according to claim 1, wherein said ring comprises an oil seal.

3. The transmission according to claim 2, wherein said oil seal is comprised of an elastomeric.

\* \* \* \* \*

UNITED STATES PATENT AND TRADEMARK OFFICE
CERTIFICATE OF CORRECTION

PATENT NO. : 5,557,980
DATED : September 24, 1996
INVENTOR(S) : Cesare G. Mastroianni et al It is certified that error appears in the above-indentified patent and that said Letters Patent is hereby corrected as shown below:

Column 7, line 22, delete "104", insert --164--.

Signed and Sealed this

Twenty-first Day of January, 1997

Attest:

BRUCE LEHMAN

Attesting Officer     Commissioner of Patents and Trademarks